A. WAKEMAN.
VEHICLE LICENSE TAG.
APPLICATION FILED OCT. 4, 1912.

1,073,004.

Patented Sept. 9, 1913.

Witnesses
Carroll Bailey

Inventor
Abram Wakeman,
By Victor J. Evans
Attorney

UNITED STATES PATENT OFFICE.

ABRAM WAKEMAN, OF NEW YORK, N. Y.

VEHICLE LICENSE-TAG.

1,073,004.   Specification of Letters Patent.   Patented Sept. 9, 1913.

Application filed October 4, 1912. Serial No. 723,981.

*To all whom it may concern:*

Be it known that I, ABRAM WAKEMAN, a citizen of the United States, residing at New York, in the county of New York and State of New York, have invented new and useful Improvements in Vehicle License-Tags, of which the following is a specification.

The present invention relates to means for detecting numbers of license tags for automobiles, and other vehicles.

The tags now in use upon automobiles, and other vehicles generally comprise a flat plate upon which is imprinted the license number. The numbers upon the tag are clearly distinguishable when the automobile is traveling at a moderate rate of speed. At night, however, or when the automobile is driven at a rapid pace, the tag numbers become mixed or blurred to an observer. For the above reasons it is practically impossible to ascertain the tag number of a machine that is driven at an excessive speed, and as a consequence speed laws are entirely ignored, especially by the drivers of machines whose license numbers run within the thousands, and it is therefore a comparatively easy matter for reckless drivers to escape the law after inflicting injury to persons, or damages to property.

It is therefore, the primary object of my invention to provide a license tag having a distinguishing feature of color or markings, figures, letters or other characters whereby the number of the tag may be distinguished.

Figure 1:
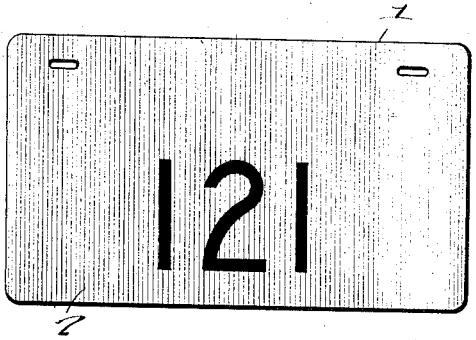
Figure 4:
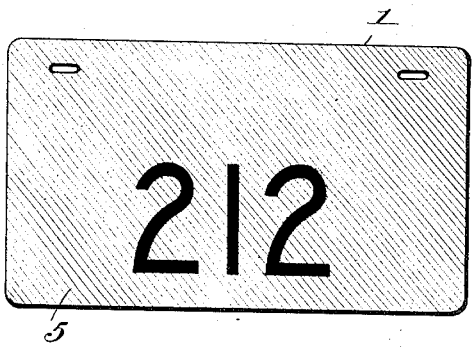
Figure 2:
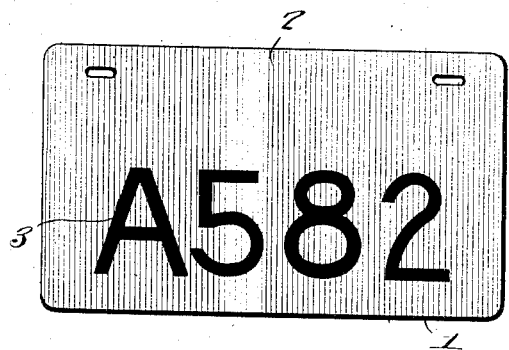
Figure 5:
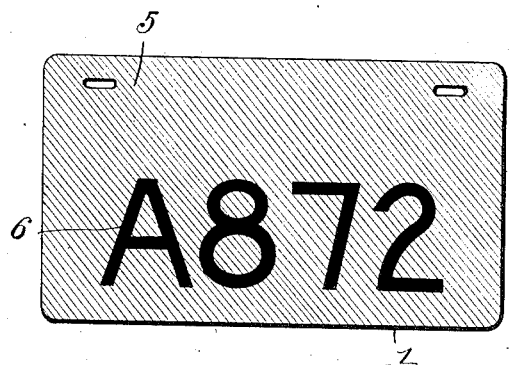
Figure 3:
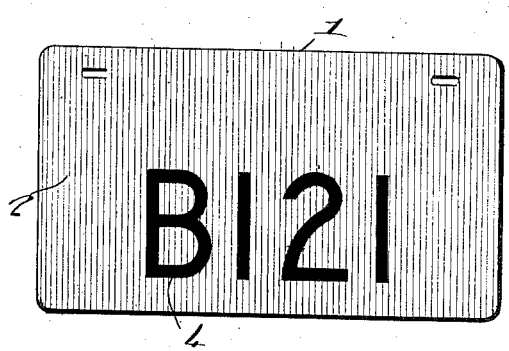

In the drawing, Figure 1 is a face view of a license tag having a distinguishing feature or color to indicate that the number of the license ranges between 1, and 999. Fig. 2 is a similar view, but illustrating the plate arranged to indicate a series of numerals which range from 1,000, to 1,999. Fig. 3 is a similar view, but illustrating a plate in which the numeral series is from 2,000, to 2,999. Fig. 4 is a view of a plate having numerals thereon, and distinguishing features which indicate that the numerals are the three end figures of a license tag which ranged between 40,000, and 40,999. Fig. 5 is a similar view of a license tag having numerals thereon, and distinguishing features which indicate that the said numerals are the last figures of a license tag having a number arranged between 41,000, and 41,999.

Figure 6:
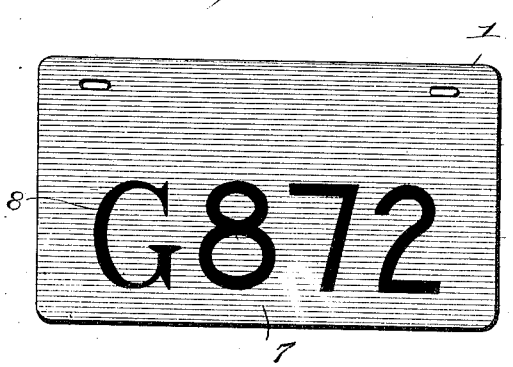

Fig. 6 is a similar view of a tag having a number thereon and distinguishing features or characters indicating that the numerals are the end figures of a tag having a license number which ranges between 66,000, and 66,999.

Referring now to the drawing in detail, the numeral 1 designates the license tag, which may be of any desired material. The tag, in the showing of Fig. 1 of the drawing, is adapted to have indicated thereon license numbers which are issued between the numerals 1, and 999. The tag or plate, in this instance is provided with some distinguishing feature of color, etc., and of course, imprinted with any of the numerals to which series it belongs. It may here be stated that it is not usually difficult to distinguish numerals on tags which contain only one, two, or three figures, and therefore the tag is duly impressed with the proper whole number. It is, however, extremely difficult to distinguish numerals on tags which extend beyond three figures, and in Fig. 2 of the drawing, I have illustrated a tag which is designed to contain only three figures, but which is provided with a distinguishing feature of color similar to the distinguishing feature referred to in connection with Fig. 1. The distinguishing feature, which is designated by the numeral 2, may, in the present instance, be in the nature of a coating of red, and the numerals upon the tag illustrated in Fig. 2 are distinguished from the series illustrated in Fig. 1 by a character 3, which is arranged upon the plate in Fig. 2. The character 3 is in the form of the alphabetical character A, and as the numerals upon the said tag are of the last three numbers of the series of figures ranging between 1,000, and 1,999, it will be observed that the proper number of the tag is 1,582; the numerals 582 being already impressed upon the plate, and the alphabetical character A designating the series to which the numerals belong.

In Fig. 3, the plate 1 is provided with the numerals 121, and is also provided with the distinguishing feature of color, similar to the distinguishing feature illustrated in Figs. 1 and 2. This feature is adapted to serve as a guide to indicate that all tags bearing the same are arranged within a series of numerals, between and including 1, to 9,999, or less than 10,000. Each separate plate divides its series into the thousands ranging first from 1 to 999, second, from 1,000, to 1,999, third, from 2,000 to 2,999, fourth, from 3,000 to 3,999, and so on until the figures reach the series between 10,000 and 19,999, when plates having a separate and distinct distinguishing feature of color, are employed. In Fig. 3, the plate, as stated, is in the series between 2,000, and 2,999, and the plate is provided with the alphabetical character B, as designated by the numeral 4. This character is adapted to serve as a means to indicate that the numerals 121 imprinted upon the plate are arranged in the series of numerals between 2,000, and 2,999, thus the distinguishing feature upon the plate, the alphabetical character, in connection with the numerals indicate that the tag number is 2,121. When the series of numerals range from 3,000 to 3,999, are employed, the plate has the same coloring, but is provided with the alphabetical character C, which being the third letter in the alphabet indicates that the numerals thereon are the last figures of the series of numerals between 3,000, and 3,999. The next plate, while bearing the same distinguishing feature of color, will be provided with the letter D, the fourth letter of the alphabet, and will indicate that the three figures impressed thereon belong to the series between 4,000, and 4,999, and so on until the figures reach the 20 thousands, when a separate distinguishing feature of color is employed. The plates, in this division are provided with the alphabetical characters similar to those described, and for the purpose as set forth.

In order to more fully illustrate the invention, I have illustrated in Fig. 4 of the drawing, a plate which is provided with a distinguishing feature of color, 5, which indicates that the three numerals thereon belong within the 40 thousands. It will be noted that no alphabetical character appears upon this plate, but the said plate is provided with the numerals 212. The coloring feature as above stated indicates the fact that the tag number is arranged in the series of numerals between 40,000, and 40,999, it will be readily deducted that the tag bears the number of 40,212.

In Fig. 5 the tag has its distinguishing feature of color similar to the color 5 in Fig. 4 of the drawing. The tag is provided with the alphabetical character A, as designated by the numeral 6, and also bears the numerals 872. A, is, of course, the first letter in the alphabet, and as the distinguishing color indicates that the tag belongs within the 40 thousands, the letter A indicates that this particular tag has its number in the 41 thousands, so by adding the 41,000 to the 872 we are sure that the tag number is 41,872.

In Fig. 6 the tag is provided with a distinguishing feature of coloring to indicate that the numerals thereon belong to the series of numerals between 70,000 and 70,999. The tag is provided with the alphabetical character G indicated by the numeral 8. G is the seventh letter of the alphabet, and we are therefore sure that the numerals upon the tag belong to the seventy-seven thousands. The numerals on the tag are 872, and we can thus readily determine that the tag number is 77,872.

From the above description, taken in connection with the drawing, the simplicity of the device, as well as its advantages will, it is thought be perfectly apparent to those skilled in the art to which such inventions appertain without further detailed description.

Having thus described the invention, what I claim is:—

1. In a license tag, the combination with a body having a particular color, of a number on the body, the color of the body indicating units of one thousand or more, and the number indicating units of nine hundred and ninety-nine or less, and which added to the units indicated by the color on the body denote the number on the tag.

2. In a license tag, the combination with a body having a particular color, of a number on the body, the color on the body indicating units of one thousand or more, a character upon the tag indicating the group within which the units indicated by the color are included, and the number indicating units of nine hundred and ninety-nine or less, and which added to the units indicated by the color and the sum indicated by the character denote the number of the tag.

In testimony whereof I affix my signature in presence of two witnesses.

ABRAM WAKEMAN.

Witnesses:
IRVING RYDER,
WM. J. GRIFFITHS.